G. W. Tolhurst.
Mower.
N° 15748. Patented Sept. 16, 1856.
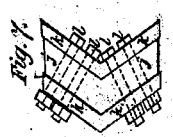
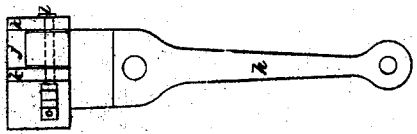
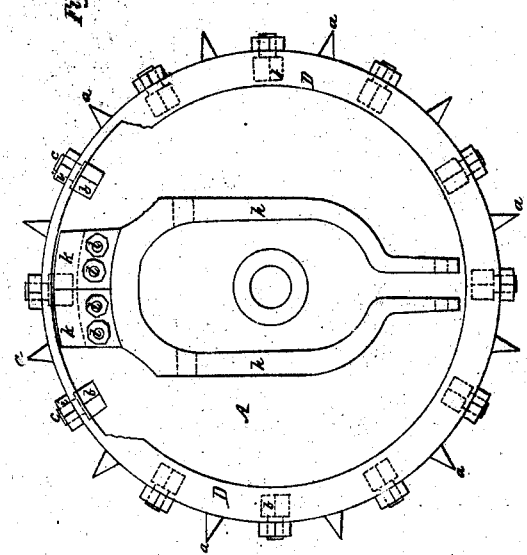
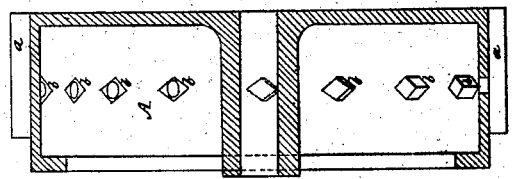
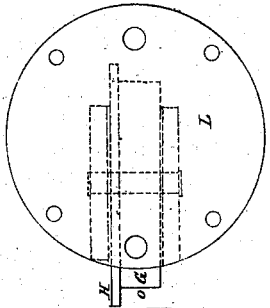
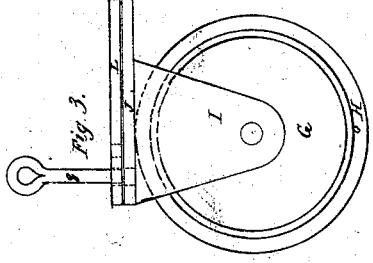
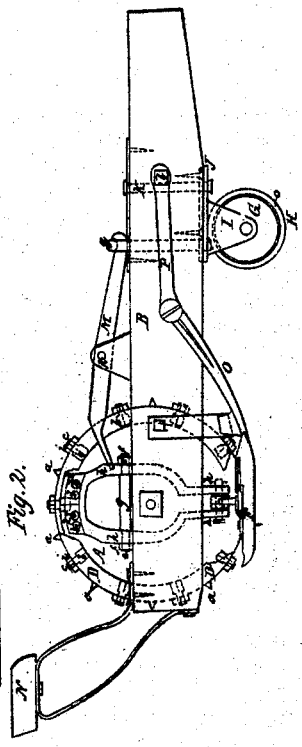
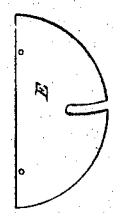
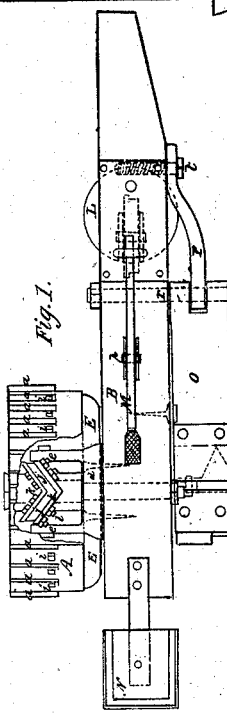

UNITED STATES PATENT OFFICE.

G. W. TOLHURST, OF CLEVELAND, OHIO.

IMPROVEMENT IN HARVESTING-MACHINES.

Specification forming part of Letters Patent No. 15,748, dated September 16, 1856.

*To all whom it may concern:*

Be it known that I, GEO. W. TOLHURST, of Cleveland, Ohio, have invented certain new and useful Improvements in Harvesting-Machines; and I do hereby declare the following to be a full, clear, and exact description of the same, reference being had to the accompanying drawings, making a part thereof, in which—

Figure 1 represents a top plan, with the rim of the driving-wheel broken away to show its interior. Fig. 2 represents a side view, and Figs. 3, 4, 5, 6, 7, 8, and 9 represent various detached portions of the machine, some of which are on an enlarged scale to more clearly show their construction.

Similar letters of the alphabet, where they occur in the several drawings, represent the same parts of the machine in all.

To enable others skilled in the art to make and use my invention, I will proceed to describe the same with reference to the drawings.

B represents a beam or frame, to which the several parts of the machine are attached.

A is the main driving and supporting wheel, hung to frame B by a suitable journal, on which it may freely turn. The wheel is hollow, and its outer end may be entirely closed up, except where the journal passes through its hub, which may be a boss on it to give the wheel proper support. The inner face or end of the wheel A has a flange, D, projecting inward from the rim, so as to make within the wheel a chamber or reservoir for containing oil or any other lubricator, which is very important in this class of machines; and said inner face may be further inclosed by covers E, one of which is seen in Fig. 9, so as to hold the lubricating material within the wheel, where the machinery for giving motion to the cutters is arranged. The periphery of the wheel is armed with ribs or projections $a\ a\ a$, which take into the ground to prevent it from slipping. Around the interior of the wheel A, in a line nearly central of its tread, is placed a single row of diamond-shaped pins, $b$, which may have screw-shanks $c$ on them, passing through the rim or tread of said wheel, and secured by nuts $i\ i\ i$, so that in case any one of them should become worn or broken, which is likely to happen, it can be readily removed and replaced by another.

To the side of the beam or frame B is bolted a metallic piece, $d$, Fig. 1, the arms $e$ of which project into the wheel about its center, and to these arms are pivoted, by a through-bolt, $f$, passing through a sleeve, $g$, Fig. 2, two levers, $h$, (or a yoke of one piece,) the object of the sleeve being to keep the levers or the arms of the yoke in position.

To the top of the levers $h$ is fastened an angular cam, $j$, Figs. 1, 2, 7, 8, which is composed of side plates, $k$, Figs. 1, 7, bolted to the head or top of the levers by screw-bolts $l\ l$. The object in thus securing the plates by screw-bolts is that in case they become worn out they can be removed and replaced by others; or if they get out of proper adjustment or become loose, so as to give too much play, they can, by the introduction or removal of thin plates between them and the head of the levers, be readjusted.

The lower ends of the levers $h$ are connected to the cutter-bar or cutters, and the vibrations which said levers receive by the diamond-shaped projections passing through the angular groove or slot $j$ are communicated to the cutters. The cutters $m$, fingers $n$, and finger-bar F may be of any of the usual well-known kinds, and need not be particularly described.

Toward the front of the beam or frame B is hung a wheel, G, the tread of which is at $o$, and projecting beyond the tread is a flange, H, sharp enough to cut into the ground. This wheel G is hung in arms I, projecting from a circular plate, J, and the plate J is pivoted by a bolt, K, to the beam or frame B, another circular plate, L, being interposed between the plate J and the beam. On top of the beam is hung, by a fulcrum-pin at $p$, a lever, M, the rear end of which projects back into convenient position for the driver in his seat at N to place his foot upon.

To the front end of the lever M is hung a king-bolt, $q$, which passes down through the beam B, plate L, and plate J, (see Fig. 3,) and when down locks the lower plate to the beam and keeps the wheel G in the line of the motion of the machine, and when thus locked the flange H, cutting into and holding laterally against the earth, prevents the side draft or tendency of the machine to run into the uncut material.

When the machine is to be turned around the driver, with his foot, presses down the end of the lever M and thus raises up the king-bolt $q$. The wheel G being then released, and having a swiveling point at K, becomes a caster-wheel and aids the machine in coming around.

Instead of the lever M for raising the bolt $q$, it may be done by a cord or chain running over a pulley and in convenient position for the operator.

O is a brace, hinged to the beam at $r$ by a bolt, and the rear end of this brace is connected to the finger-bar F to support said bar and allow said bar to rise and fall as the character of the ground may require. A drag-bar, P, is also fastened at $r$, and, extending forward, is secured to the beam at $t$ to aid the brace O in sustaining the drag of the finger-bar.

Having thus fully described the nature of my invention, I would state that I am aware that continuous zigzag slots or ledges have been used of various kinds; but when these become damaged by wear they are irreparable. I do not claim any of these; but

What I do claim as new, and desire to secure by Letters Patent, is—

The combined use of the single row of removable pins with the adjustable angular slot $j$, for the purpose of procuring a vibratory motion to be applied to the cutters, as set forth.

G. W. TOLHURST.

Witnesses:
JOHN DAVIS,
JOHN S. HOLLINGSHEAD.